United States Patent [19]

Ueno et al.

[11] Patent Number: 5,048,945
[45] Date of Patent: Sep. 17, 1991

[54] PROGRESSIVE POWER LENS

[75] Inventors: Yasunori Ueno, Kawasaki; Fumio Takahashi, Tone; Ryuji Aizawa, Yoshimi, all of Japan

[73] Assignee: Nikon Corporation, Tokyo, Japan

[21] Appl. No.: 551,082

[22] Filed: Jul. 11, 1990

[30] Foreign Application Priority Data

Jul. 14, 1989 [JP] Japan ................................. 1-181936
Jul. 14, 1989 [JP] Japan ................................. 1-181937

[51] Int. Cl.$^5$ .............................................. G02C 7/06
[52] U.S. Cl. .................................................. 351/169
[58] Field of Search ............................... 351/168-172

[56] References Cited

U.S. PATENT DOCUMENTS 3,687,528 8/1972 Maitenaz ............................. 351/169
3,910,691 10/1975 Maitenaz ............................. 351/169
4,946,270 8/1990 Guilino et al. ...................... 351/169

FOREIGN PATENT DOCUMENTS

59-42285 10/1984 Japan .

Primary Examiner—Scott J. Sugarman
Attorney, Agent, or Firm—Shapiro and Shapiro

[57] ABSTRACT

In a progressive power lens has a farsight portion having a refracting power corresponding to a distant view, a nearsight portion having a refracting power corresponding to a near view, and an intermediate portion for continuously and smoothly connecting the refracting powers of the farsight and nearsight portions between the two portions along a principal meridional curve, when the intermediate portion as a progressive power range is shortened, optimal shapes of respective portions are found out in terms of a vertical sectional shape of a refracting surface, and an aberration blance in the overall refracting surface is optimized.

11 Claims, 8 Drawing Sheets

PROGRESSIVE POWER LENS

BACKGROUND OF THE INVENTION

1. Field of the Invention

The present invention relates to a spectacle lens used to assist an accommodation power of an eye and, more particularly, to a progressive power lens, a refracting power of which is continuously changed in its intermediate portion.

2. Related Background Art

As spectacle lenses for assisting an accommodation power when an accommodation power of an eye becomes too weak to see a near point, various progressive power lenses have been known. A progressive power lens of this type has an upper hyperopia correcting region (to be referred to as a "farsight portion" hereinafter), a lower myopia correcting region (to be referred to as a "nearest portion" hereinafter), and a progressive region (to be referred to as an "intermediate portion" hereinafter) which is located between the above two portions and in which a refracting power is continuously changed.

In a progressive power lens of this type, in general, when wide distinct vision areas of the farsight and nearsight portions are kept and are coupled by a progressive power range in which a refracting power is continuously changed, a lens aberration is concentrated on a side region of the progressive power range. Thus, the presence of this region leads to blurring and distortion of an image, and a user who wears spectacles experiences a fluctuation of an image when he or she turns his or her eyes.

In order to prevent such a problem of visual characteristics, in known progressive power lenses, designs and evaluations have been made from a variety of viewpoints. As for the shape of a lens surface, a crossing curve defined by a section extending along a vertical meridian vertically passing through substantially the center of a lens surface and an object-side lens surface is used as a reference curve for expressing specifications such as a dioptric power of a lens, and is also used as an important reference curve in a lens design. In a progressive power lens in which a nearsight portion is asymmetrically arranged in consideration of the fact that the nearsight portion comes close to a nose side when the lens is worn, a vertical central line passing through the centers of both the farsight and nearsight portions is used as a reference line. In the present invention, these reference curve and line will be referred to as "a principal meridian curve" hereinafter.

As conventional progressive power lenses, lenses disclosed in, e.g., U.S. Pat. Nos. 3,687,528 and 3,910,691, Japanese Patent Publication No. 59-42285, and the like are known.

These prior arts can improve visual characteristics to some extent. However, such improvements are insufficient in practical applications. More specifically, in a lens disclosed in U.S. Pat. No. 3,687,528, as for the shapes of crossing curves defined by a plane perpendicular to the principal meridional curve and a refracting surface of a lens, only a crossing curve at a point corresponding to substantially the center of an intermediate portion defines a circular arc. Crossing curves above and below the point define non-circular arcs in which a radius of curvature is decreased as the crossing curve is spaced apart from the principal meridional curve in a portion above the point, and vice versa in the a portion below the point. Therefore, in the lens disclosed in U.S. Pat. No. 3,687,528, only the center of the intermediate portion defines a circular arc, and other portions define simple non-circular arcs. Therefore, distinct vision areas (ranges with an astigmatic difference of 0.5 D (diopter) or less) of the farsight and nearsight portions become narrow, and a field of view is also narrowed due to an abrupt change in aberration, resulting in considerable distortion and fluctuation of an image.

In a lens disclosed in U.S. Pat. No. 3,910,691, the dynamic vision such as fluctuation of an image is improved in addition to an improvement in the static vision in the lens disclosed in U.S. Pat. No. 3,687,528. However, although the dynamic vision can be improved to some extent, it is still difficult to attain a sufficient performance in practical use.

In a lens disclosed in Japanese Patent Publication No. 59-42285, as for the shapes of crossing lines each defined by a plane perpendicular to the principal meridional curve and a refracting surface of a lens, the crossing lines define non-circular arcs in an upper portion of the farsight portion. More specifically, in the upper portion of the farsight portion, the radius of curvature of each crossing curve is decreased as it goes away from the principal meridional curve, a rate of decrease in radius of curvature approaches 0 toward an upper peripheral portion, and a crossing curve near the upper peripheral portion has a constant radius of curvature. In a lower portion of the farsight portion, the radius of curvature of each crossing curve is linearly decreased. In the intermediate portion, crossing curves define non-circular arcs except for a connecting portion with the farsight portion, in which the radius of curvature of each crossing curve is increased and then decreased as it goes away from the principal meridional curve. In the nearsight portion, the radius of curvature is increased and then decreased as it goes away from the principal meridional curve. In this lens, visual characteristics can be improved to some extent as compared to those disclosed in U.S. Pat. Nos. 3,910,691 and 3,687,528. However, in a peripheral region of the farsight portion, in particular, in a side region between the central and lower portions of the farsight portion, a residual astigmatic difference is still considerable. In addition, side regions of the intermediate and farsight portions still suffer from large distortion and fluctuation of an image. Thus, it is yet difficult to obtain a wide field of view.

In general, when the intermediate portion as a progressive power range extending along the principal meridional curve is shortened, an aberration is immediately increased since a refracting power undergoes an abrupt change. As can be seen from the Minkwittz's law, especially near the principal meridional curve, an aberration tends to be abruptly increased and the width of the progressive power range tends to be decreased. In addition, fluctuation and distortion of an image are abruptly increased. On the other hand, when the progressive power range is relatively long, an astigmatic difference, and fluctuation and distortion of an image can be easily eliminated since a change in refracting power is relatively slow. However, if the progressive power range is too long, a desired dioptric power cannot be obtained unless a user sufficiently lowers his or her eye point when he or she wears such spectacles, resulting in inconvenience.

SUMMARY OF THE INVENTION

It is therefore an object of the present invention to provide a progressive power lens which is balanced in terms of an aberration even when an intermediate portion as a progressive power range is shortened and, more particularly, to provide a progressive power lens which has a wide field of view in a lower farsight portion, has intermediate and nearsight portions having practically wide distinct vision areas, can eliminate distortion and fluctuation of an image in a portion around the intermediate and nearsight portions as much as possible, and does not make a user uncomfortable in a sideward view.

In order to achieve the above object, according to the present invention, in a progressive power lens which has a farsight portion having a refracting power corresponding to a distant view, a nearsight portion having a refracting power corresponding to a near view, and an intermediate portion for continuously and smoothly connecting the refracting powers of the farsight and nearsight portions between the two portions along a principal meridional curve, when the intermediate portion as a progressive power range is shortened, optimal shapes of respective portions are found out in terms of a vertical sectional shape of a refracting surface, and an aberration balance in the overall refracting surface is optimized.

More specifically, the vertical sectional shape of the refracting surface of the farsight portion is defined as follows. That is, in an upper portion of the farsight portion, a value of a radius of curvature in a vertical direction (to be referred to as a "vertical radius of curvature" hereinafter) is increased as it goes away from an intersection with the principal meridional curve along a horizontal section curve, and in a lower portion of the farsight portion, the value of the vertical radius of curvature is decreased as it goes away from the intersection with the principal meridional curve along a horizontal section curve. In a substantially central portion of the farsight portion, the vertical radius of curvature of the refracting surface becomes almost constant along the horizontal section curve. In an upper portion of the intermediate portion, the vertical sectional shape of the refracting surface is defined such that the value of the vertical radius of curvature is decreased as it goes away from an intersection with the principal meridional curve along the horizontal section curve. In a lower portion of the intermediate portion and an upper portion of the nearsight portion, the vertical radius of curvature is increased and then decreased as it goes away from the intersection with the principal meridional curve along the horizontal section curve.

In the lower portion of the intermediate portion, a position where the value of the vertical radius of curvature is increased and then decreased as it goes away from the intersection with the principal meridional curve along the horizontal section curve is effectively set to be separated from the principal meridional curve as it comes closer to the nearsight portion, and is separated by at least 15 mm from the principal meridional curve in a vertical direction.

Near the center of the nearsight portion N, the vertical radius of curvature of the refracting surface is increased and then becomes almost constant as it goes away from the intersection with the principal meridional curve along the horizontal section curve.

A position in a side region of the nearsight portion where an increase in vertical radius of curvature is stopped and the vertical radius of curvature then becomes constant is preferably present within a region separated from the principal meridional curve by W/4 to 3W/4 in the vertical direction (where W is the radius of a circular progressive power lens).

In the vertical sectional shape of the refracting surface in the upper portion of the farsight portion, the value of the vertical radius of curvature is increased as it goes away from the principal meridional curve along the horizontal section curve, and the vertical radius of curvature of the lower portion of the farsight portion has a tendency opposite to that of the upper portion. The vertical radius of curvature becomes almost constant in substantially the central portion of the farsight portion. For this reason, the farsight portion can be smoothly connected to the intermediate portion while keeping the very wide farsight portion., and a concentration of an astigmatic difference in a side portion of the intermediate portion can be weakened. In the lower portion of the intermediate portion and the upper portion of the nearsight portion, the value of the vertical radius of curvature is increased and then decreased as it goes away from the intersection with the principal meridional curve along the horizontal section curve. Therefore, even when the intermediate portion is short, a wider distinct vision area of the intermediate portion can be assured, and distortion and fluctuation of an image in a peripheral portion can be eliminated.

At the center of the nearsight portion, the vertical sectional shape of the refracting surface is defined such that the value of the vertical radius of curvature is increased and then becomes almost constant as it goes away from the intersection with the principal meridional curve along the horizontal section curve. Therefore, although the farsight portion can have a wide distinct vision area according to the above-mentioned shape, concentration of an astigmatic difference in the intermediate and nearsight portions can be eliminated to be well balanced, and fluctuation and distortion of an image in a side region can be relaxed, thus improving vision.

The horizontal sectional shape of the retracting surface in the lower portion of the farsight portion defines a non-circular arc in which a value of a radius of curvature in a horizontal direction (to be referred to as a "horizontal radius of curvature" hereinafter) is decreased and then increased as it goes away from the intersection with the principal meridional curve along the horizontal section curve. The horizontal sectional shape of the refracting surface in the upper portion of the farsight portion defines a non-circular arc in which the value of the horizontal radius of curvature is increased and then decreased as it goes away from the intersection with the principal meridional curve along the horizontal section curve. In substantially the central portion of the farsight portion, the horizontal sectional shape of the refracting surface along the horizontal section curve defines almost a circular arc. The horizontal sectional shape of the refracting surface between the central portion of the intermediate portion and the upper portion of the nearsight portion defines a non-circular arc in which the value of the horizontal radius of curvature is increased and then becomes almost constant as it goes away from the intersection with the principal meridional curve along the horizontal section curve.

In the horizontal sectional shape of the refracting surface of the upper portion of the farsight portion, the horizontal radius of curvature is increased and then decreased as it goes away from the principal meridional curve, and the lower portion of the farsight portion has a tendency opposite to that of the upper portion of the farsight portion. In almost the central portion of the farsight portion, the horizontal sectional shape defines almost a circular arc. For this reason, the farsight portion can be smoothly connected to the intermediate portion while keeping the very wide farsight portion, and concentration of an astigmatic difference in a side portion of the intermediate portion can be weakened. Therefore, a wider distinct vision area of the intermediate portion can be assured, and distortion and fluctuation of an image in a peripheral portion can be eliminated.

In the lower portion of the intermediate portion P and the upper portion of the nearsight portion N, the horizontal sectional shape of the refracting surface defines a non-circular arc in which the value of the horizontal radius of curvature is increased and then becomes almost constant as it goes away from the intersection with the principal meridional curve. For this reason, although the farsight portion can have a wide distinct vision area according to the above-mentioned shape, concentration of an astigmatic difference in the intermediate and nearsight portions can be eliminated to be well balanced, and fluctuation and distortion of an image in a side region can be relaxed, thus improving vision.

In the upper portion of the intermediate portion, the horizontal sectional shape of the refracting surface defines a non-circular arc in which the value of the horizontal radius of curvature is increased as it goes away from the intersection with the principal meridional curve. A rate of increase in radius of curvature is preferably increased toward the nearsight portion.

In the horizontal sectional shape of the refracting surface between the lower portion of the intermediate portion and the upper portion of the nearsight portion, a position where the value of the horizontal radius of curvature is increased and then becomes almost constant as it goes away from the intersection with the principal meridional curve is preferably present in a region separated by W/4 to 3W/4 from the principal meridional curve in the vertical direction (where W is the radius of a progressive power lens).

In at least the central portion of the nearsight portion of the refracting surface between the intermediate portion P and the nearsight portion N, a surface refracting power in a direction extending along the horizontal section of the refracting surface in a region separated by W/2 or more from the principal meridional curve in the vertical direction preferably falls within a range of $\pm A/2$ D (where A (D) is the dioptric power) with respect to a surface refracting power of the center of the farsight portion.

According to the present invention, there can be realized a progressive power lens, which, even when the intermediate portion as a progressive power range is shortened, has a wide field of view in the lower portion of the farsight portion, has the intermediate and nearsight portions having practically wide distinct vision areas, can eliminate distortion and fluctuation of an image around the intermediate and nearsight portions as much as possible, does not make a user uncomfortable in a sideward view, and is well balanced in terms of an aberration. Therefore, a progressive power lens which can be worn by a person who uses lenses of this type for the first time without feeling uneasy can be realized.

Other objects, features, and advantages of the present invention will become apparent from the following detailed description of the preferred embodiment taken in conjunction with the accompanying drawings.

DESCRIPTION OF THE PREFERRED EMBODIMENT

The preferred embodiment of the present invention will be described in detail below with reference to the accompanying drawings.

Figure 1:
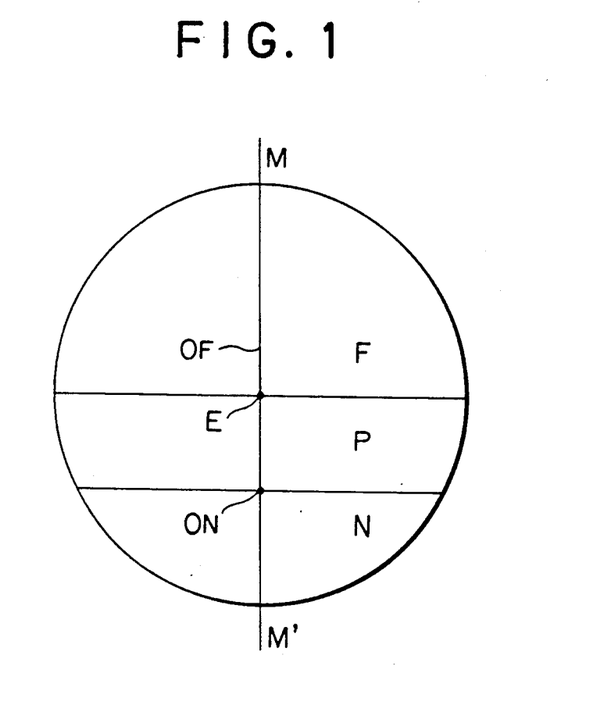
FIG. 1 is a schematic plan view showing divisions of regions of a progressive power lens according to an embodiment of the present invention.
Figure 2:
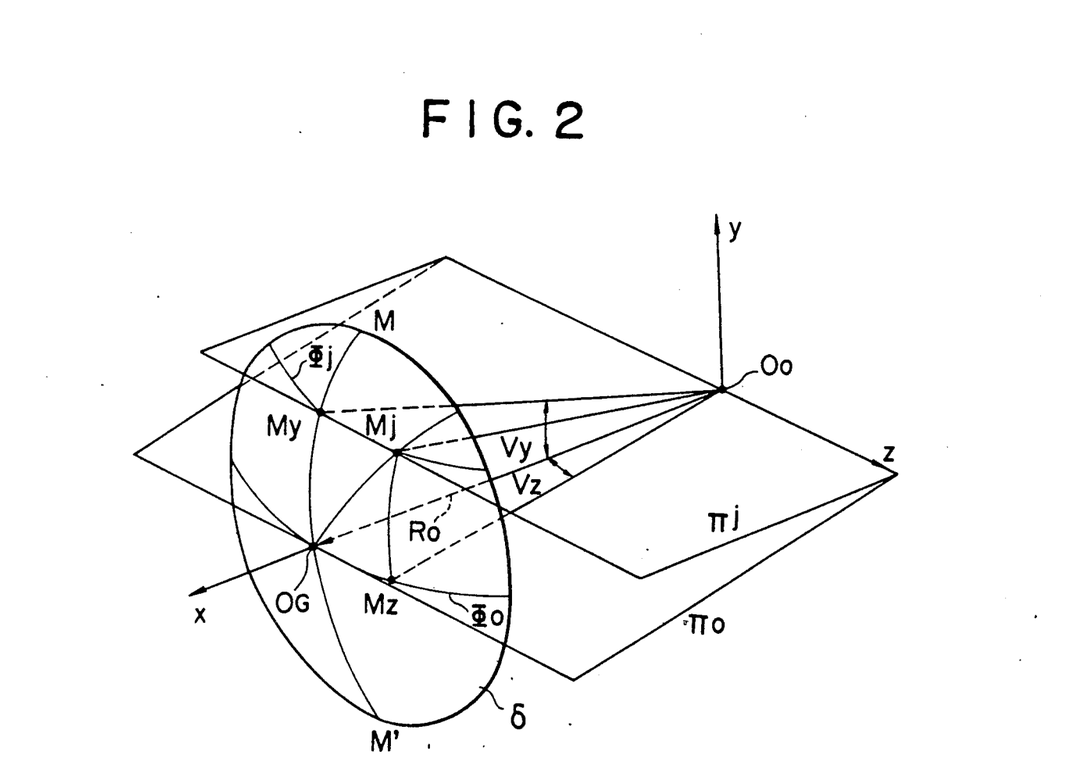
FIG. 2 is a perspective view for explaining a horizontal section of the progressive power lens.
Figure 3:
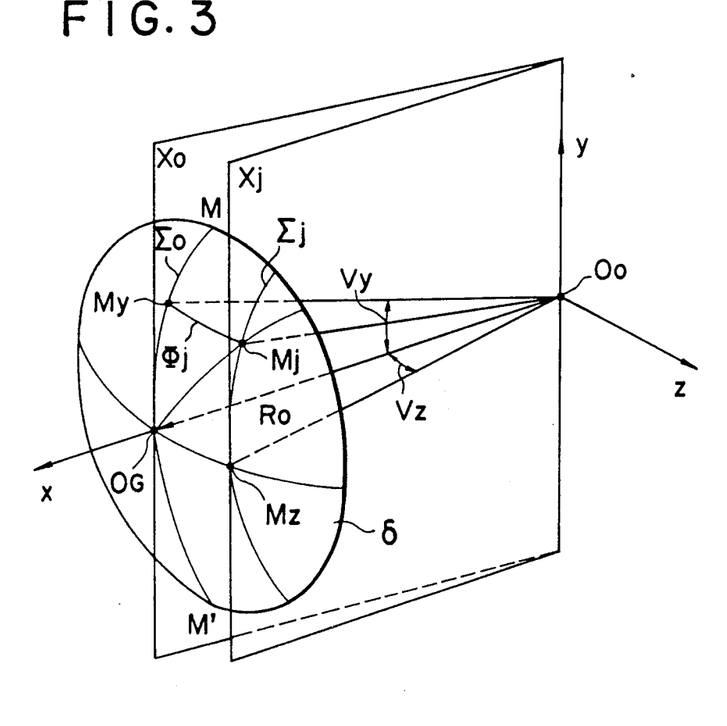
FIG. 3 is a perspective view for explaining a vertical section of the progressive power lens.

FIG. 1 is a schematic plan view showing division of regions of a progressive power lens according to the present invention, and FIGS. 2 and 3 are perspective views for explaining horizontal and vertical sections of the progressive power lens, respectively.

As shown in FIG. 1, the progressive power lens of the present invention comprises, along a principal meridional curve MM', a farsight portion F having a refracting power corresponding to a distant view, a nearsight portion N having a refracting power corresponding to a near view, and an intermediate portion P, located between the farsight and nearsight portions F and N, for smoothly connecting the refracting powers of the farsight and nearsight portions F and N. Points $O_F$, $O_N$, and E on the principal. Meridional curve MM' respectively indicate the center of the farsight portion, the center of the nearsight portion, and the position of a farsight eye point. Prior to the detailed description of the embodiment of the present invention, the horizontal and vertical sections of the progressive power lens according to the present invention will be described in detail below.

In the perspective views of the progressive power lens in FIGS. 2 and 3, an optical axis is plotted to pass through a geometric center $O_G$ of a lens, and is expressed as an X-axis. The curvature central position of a refracting surface at the geometric center $O_G$ is represented by a center $O_O$. In addition, a spherical surface having a radius of curvature $R_0$ of a refracting surface $\sigma$ at the geometric center $O_G$ as its radius is represented by a reference spherical surface. Therefore, the reference spherical surface contacts the refracting surface $\sigma$ of the lens at the geometric center $O_G$. Y- and Z-axes are respectively plotted in the vertical and horizontal directions to have the center $O_O$ of the reference spherical surface as the origin.

The horizontal section in the lens of the present invention indicates a horizontal section of the refracting surface $\sigma$ of the lens defined by a plane $\pi_j$ passing through the center $O_O$ of the reference spherical surface and perpendicular to a plane (X-Y plane) including the principal meridional curve MM', and is expressed as a horizontal section crossing curve $\Phi_j$, as shown in FIG. 2. The vertical section in the lens of the present invention indicates a vertical section defined by a plane $\chi_j$ passing through the center $O_O$ of the reference spherical surface and including the Y-axis, and is expressed by a vertical section crossing curve $\Sigma_j$, as shown in FIG. 3.

Figure 4:
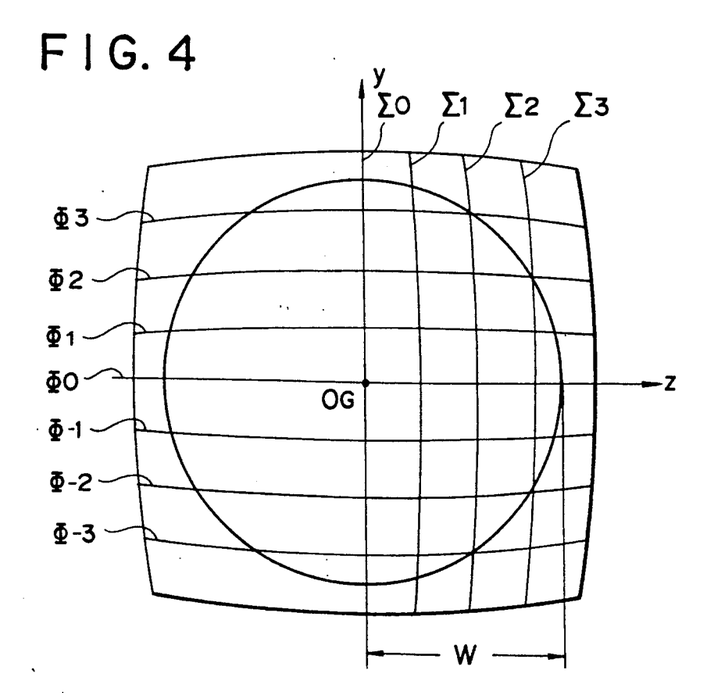
FIG. 4 is a plan view showing states of horizontal and vertical section crossing curves of the progressive power lens according to the embodiment of the present invention.
Figure 5:
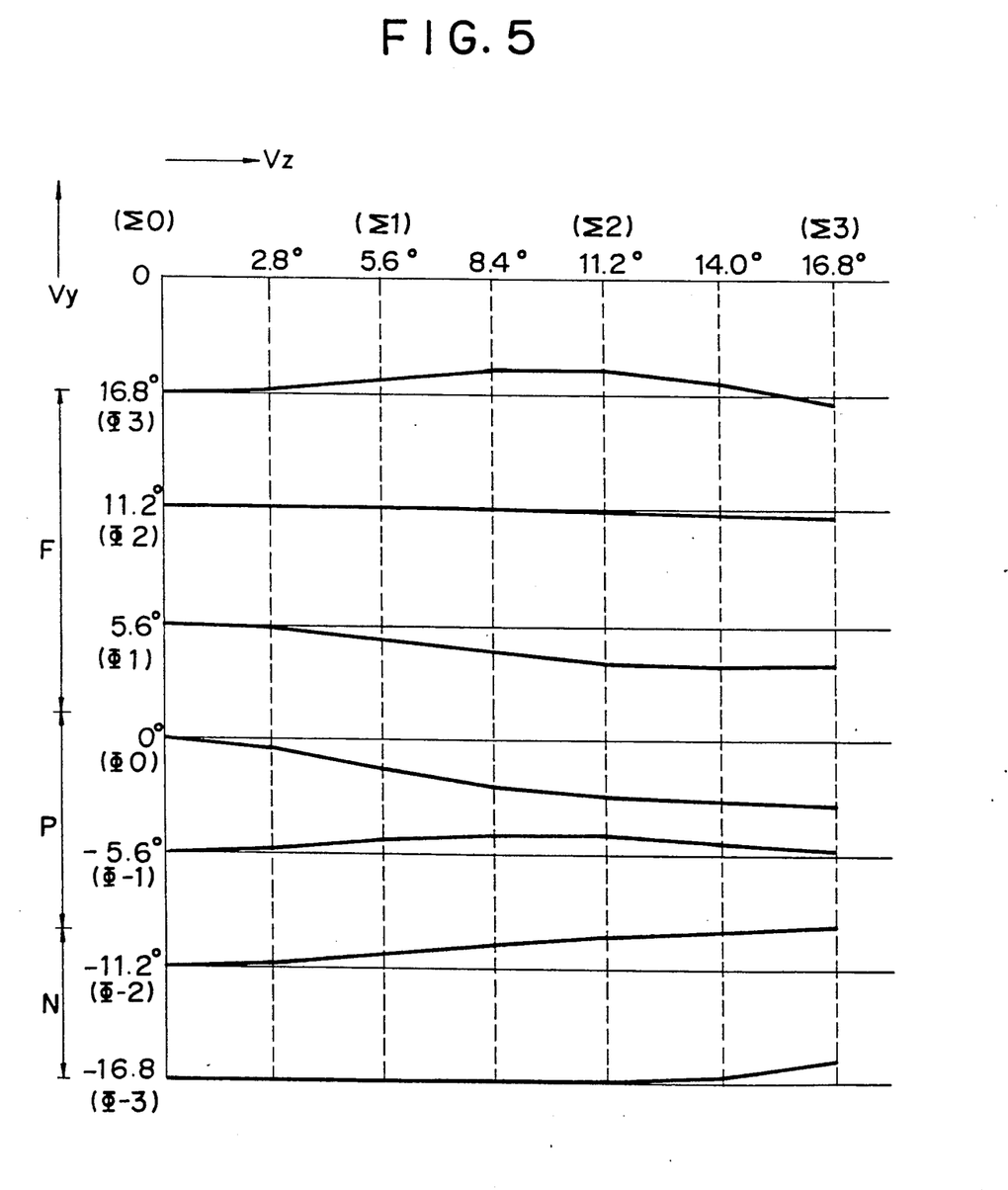
FIG. 5 is a graph showing a change in vertical radius of curvature along the horizontal section of the progressive power lens according to the embodiment of the present invention.
Figure 7:
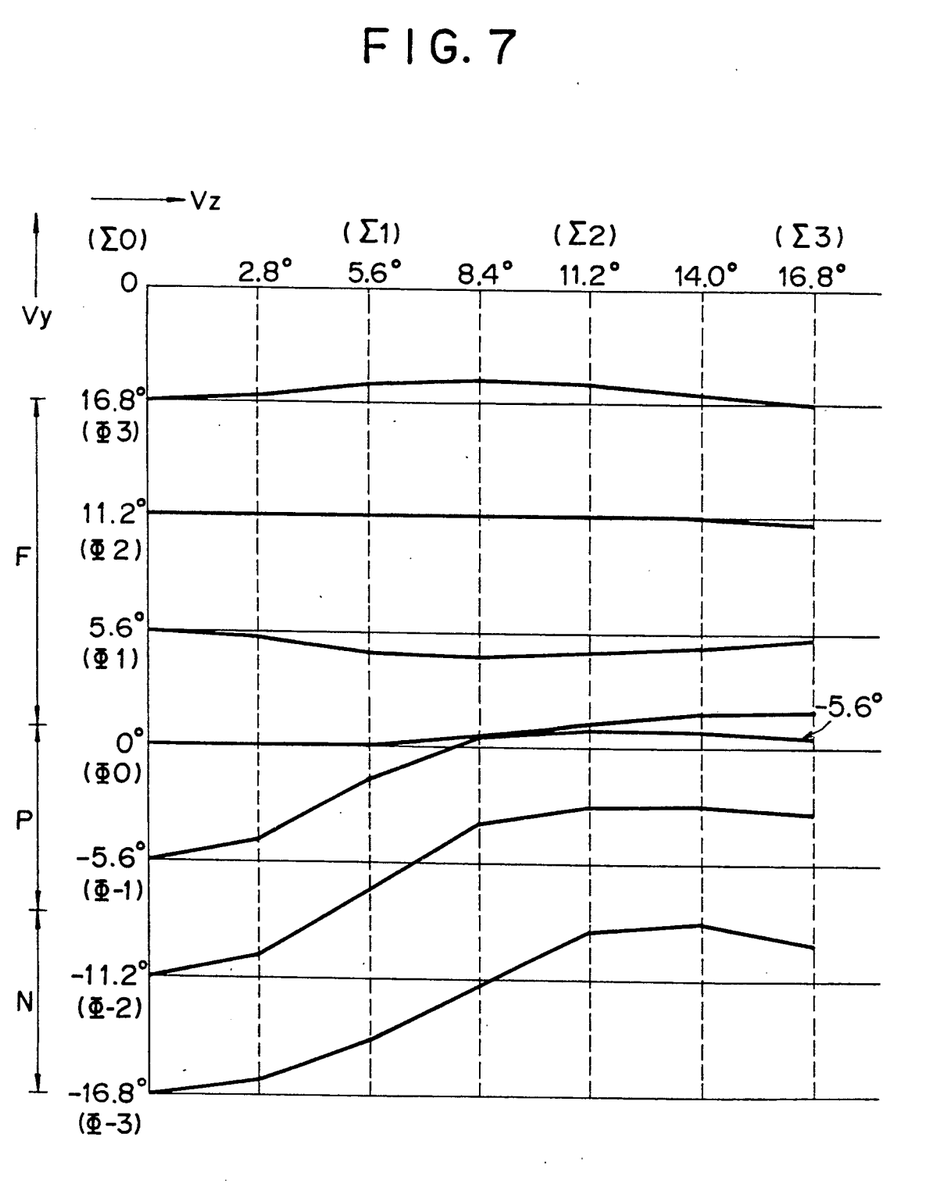
FIG. 7 is a graph showing a change in horizontal radius of curvature along the horizontal section of the progressive power lens according to the embodiment of the present invention.

FIG. 4 is a plan view showing planar positions of the horizontal section crossing curve $\Phi_j$ and the vertical section crossing curve $\Sigma_j$ on the lens refracting surface. FIG. 5 shows a change in vertical radius of curvature of the right half portion of the refracting surface $\sigma$ along horizontal section crossing curves ($\Phi_3$, $\Phi_2$, $\Phi_1$, . . .) shown in FIG. 4 with reference to the vertical radius of curvature on the principal meridional curve MM'. FIG. 7 shows a change in horizontal radius of curvature of the right half portion of the refracting surface $\sigma$ along horizontal section crossing curves ($\Phi_3$, $\Phi_2$, $\Phi_1$, . . .) shown in FIG. 4 with reference to the horizontal radius of curvature on the principal meridional curve MM'. Note that the horizontal and vertical section crossing curves $\Phi_j$ and $\Sigma_j$ respectively mean horizontal and vertical section curves in the present invention, as a matter of course.

More specifically, in FIG. 5, values of vertical radii of curvature of the right-hand side of the principal meridional curve MM' are plotted along horizontal section crossing curves of seven typical horizontal sections crossing the principal meridional curve MM' with reference to the vertical radius of curvature on the principal meridional curve MM'. The value of each vertical radius of curvature plotted in FIG. 5 is one at an intersection $M_j$ of the horizontal section crossing curve $\Phi_j$ of the refracting surface $\sigma$ defined by the plane $\pi_j$ passing through the center $O_O$ of the reference spherical surface and including the principal meridional curve MM' and a vertical crossing curve $\Sigma_i$ defined by a vertical plane $\chi_j$ including the Y-axis.

Curves shown in FIG. 5 are obtained as follows. That is, an angle $V_z$ in the horizontal direction defined between the vertical plane $(\chi_j)$ including the Y-axis and the plane (X-Y plane) including the principal meridional curve MM' is plotted every 2.8° on respective horizontal sections along seven horizontal section crossing curves ($\Phi_3$, $\Phi_2$, $\Phi_1$, $\Phi_0$, $\Phi_{-1}$, $\Phi_{-2}$, $\Phi_{-3}$) defined by seven planes ($\pi_3$, $\pi_2$, $\pi_1$, $\pi_0$, $\pi_{-1}$, $\pi_{-2}$, $\pi_{-3}$) obtained by changing an angle $V_y$ defined between the plane $\pi_j$ perpendicular to the plane (X-Y plane) passing through the center of the reference spherical surface and including the principal meridional curve MM' and the optical axis (X-axis) every 5.6°, and the values of vertical radii of curvature at respective positions are connected with reference to the vertical radius of curvature on the principal meridional curve MM'.

As shown in FIG. 5, in this embodiment, the shape of the vertical section of the refracting surface in an upper portion (16.8°) of the farsight portion F is formed so that the value of the vertical radius of curvature is increased and then decreased as it goes away from the intersection with the principal meridional curve MM'. Meanwhile, the shape of the vertical section of the refracting surface in a lower portion (5.6°) of the farsight portion F is formed so that the value of the vertical radius of curvature is decreased as it goes away from the intersection with the principal meridional curve MM'. In substantially the central portion (11.2°) of the farsight portion F, the shape of the vertical section of the refracting surface is formed so that the vertical radius of curvature of the refracting surface becomes almost constant.

The vertical sectional shape of the refracting surface near an upper portion (0°) of the intermediate portion P is formed so that the vertical radius of curvature is decreased as it goes away from the intersection with the principal meridional curve MM' along the horizontal section curve, and the vertical sectional shape of the refracting surface in a lower portion −5.6°) is formed so that the vertical radius of curvature is increased and then decreased as it goes away from the intersection with the principal meridional curve MM' along the horizontal section curve.

The vertical sectional shape of the refracting surface near the center $O_N$ (−11.2°) of the nearsight portion N is formed so that the vertical radius of curvature is increased and then becomes almost constant as it goes away from the intersection with the principal meridional curve MM' along the horizontal section curve. A change position near the center $O_N$ of the nearsight portion where an increase in vertical radius of curvature is stopped and the vertical radius of curvature becomes almost constant corresponds to a position at about half of W (FIG. 4; where W is the radius of the progressive power lens). In practice, this position is preferably present within a region separated by W/4 to 3W/4 from the principal meridional curve MM' ($\Sigma_0$) in the horizontal direction. A constant value after an increase in vertical radius of curvature in the region aside the center $O_N$ of the nearsight portion is about 13% of the vertical radius of curvature at the intersection between its horizontal section and the principal meridional curve. In practice, the constant value falls within a range of 10% to 50%, and preferably within the range of 10% to 30%. In general, W = 30 to 40 mm.

Figure 6:
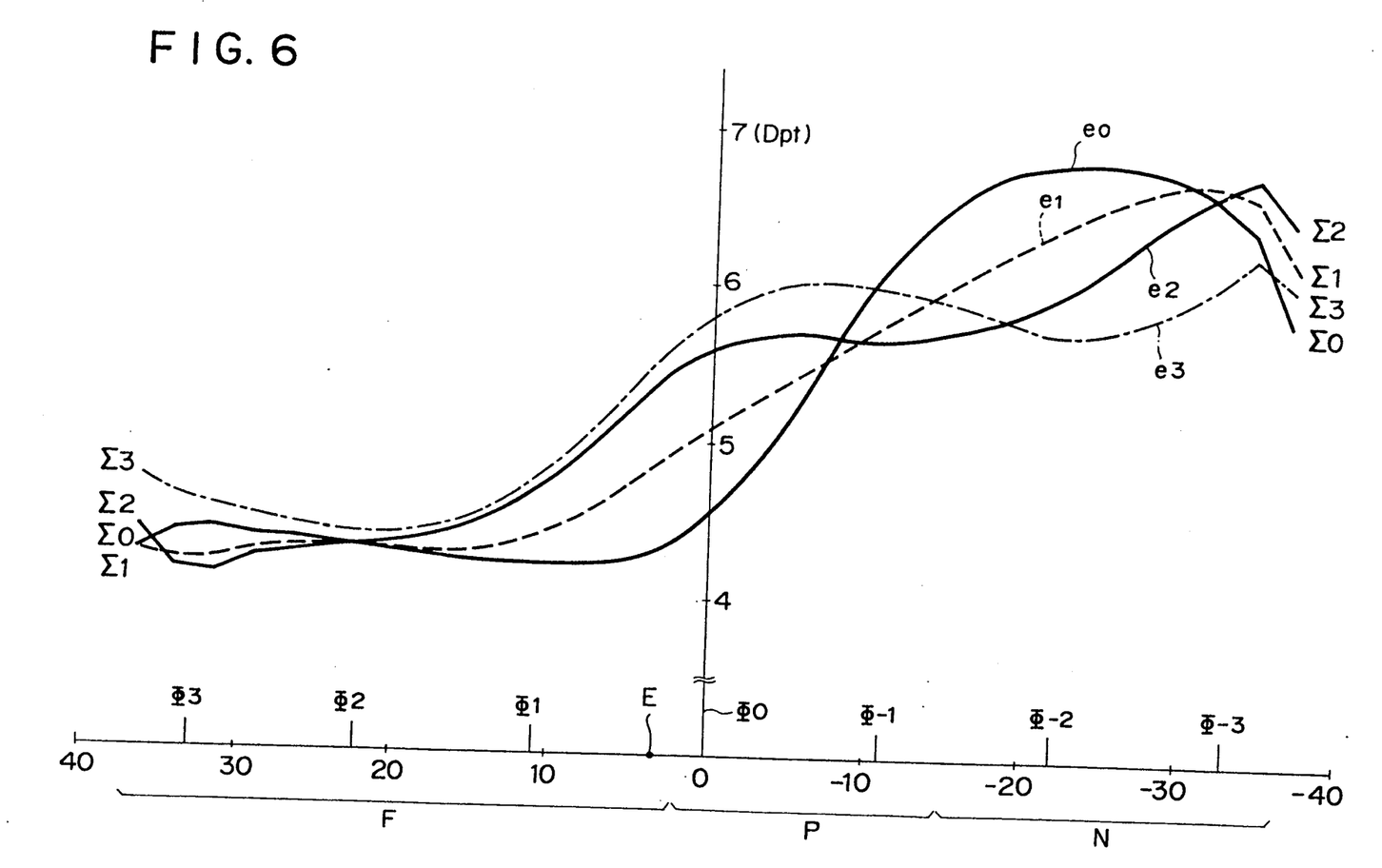
FIG. 6 is a graph showing a change, along the vertical section crossing curve, in refracting power in the vertical direction of the progressive power lens according to the embodiment of the present invention.

FIG. 6 shows a change in refracting power in the vertical direction corresponding to the vertical radius of curvature along the vertical crossing curve $\Sigma_i$. More specifically, in FIG. 6, vertical refracting powers at respective points on the refracting surface $\sigma$ are plotted along the vertical crossing curves $\Sigma_i$ defined by the vertical plane $(\chi_i)$ including the Y-axis, and a vertical change in vertical radius of curvature of the refracting surface $\sigma$ is illustrated. That is, the radius of curvature and the refracting power have a close relationship, and a radius of curvature $\rho$ is given by:

$$\rho = 1/R_V$$

where $R_V$ is the vertical radius of curvature, and n is the refractive index of the lens. A vertical refracting power $D_V$ has the following relationship:

$$D_V = (n-1)/R_V = (n-1)\rho$$

When the vertical radius of curvature $R_V$ is expressed in units of meters, the refracting power $D_V$ is expressed in units of diopters.

The vertical section crossing curve $\Sigma_0$ in FIG. 6 coincides with the principal meridional curve MM' ($V_z = 0°$), and a change in vertical refracting power along the principal meridional curve MM' is expressed by a curve $e_0$. $\Sigma_1$, $\Sigma_2$, and $\Sigma_3$ respectively correspond to $V_z = 5.6°$, 11.2°, and 16.8°, and changes in vertical refracting power along the corresponding vertical section crossing curves are expressed by curves $e_1$, $e_2$, and $e_3$, respectively. Assuming that $V_z = 16.8°$ almost corresponds to a maximum effective diameter as a progressive power lens, $\Sigma_1$, $\Sigma_2$, and $\Sigma_3$ respectively correspond to W/3, 2W/3, and W with respect to the radius W of the lens.

As indicated by a curve $e_3$ in FIG. 6, in the upper portion of the farsight portion F, the vertical refracting power at the side edge portion ($\Sigma_3$) becomes larger and the vertical refracting powers ($e_1$, $e_2$) at the side middle portions ($\Sigma_1$, $\Sigma_2$) of the lens become smaller than the vertical refracting power ($e_0$) on the principal meridional curve, and they are almost equal to each other in the middle portion of the farsight portion F. At the farsight eye point position E at the lower end of the farsight portion F, a refracting power at the side edge portion ($\Sigma_3$) becomes larger than the refracting power ($e_0$) as a minimum refracting power on the principal meridional curve than refracting powers ($e_1$, $e_2$) at the side middle portions ($\Sigma_1$, $\Sigma_2$) of the lens are.

At substantially the center of the intermediate portion P, the refracting powers $e_0$, $e_1$, and $e_2$ substantially coincide with each other, and the refracting power $e_3$ is larger than the remaining refracting powers $e_0$, $e_1$, and $e_2$. Therefore, it can be seen from FIG. 6 that the vertical refracting power is almost constant along the horizontal section curve, and is then decreased. In the lower portion of the intermediate portion P, the refracting power ($e_0$) on the principal meridional curve becomes largest among the refracting powers $e_0$ to $e_3$, is decreased toward sideways, and is then increased. This tendency continues up to the upper portion of the nearsight portion N.

In the nearsight portion N, the refracting powers $e_1$, $e_2$, and $e_3$ become smaller in the order named than the vertical section refracting power ($e_0$) on the principal meridional curve having a maximum refracting power near the center of the nearsight portion.

In FIG. 5, a position where the vertical radius of curvature is shifted from an increasing tendency to a decreasing tendency as it goes away from the intersection with the principal meridional curve along the horizontal section curve is separated from the principal meridional curve MM' toward the nearsight portion N, and reaches a position separated by at least 15 mm from the principal meridional curve MM'.

In FIG. 7, values of horizontal radii of curvature on the right-hand side of the principal meridional curve MM' are plotted along horizontal section crossing curves of seven typical horizontal sections crossing the principal meridional curve MM' with reference to the horizontal radius of curvature on the principal meridional curve MM'. The value of each horizontal radius of curvature plotted in FIG. 7 is one at an intersection $M_j$ of the horizontal section crossing curve $\Phi_j$ of the refracting surface $\sigma$ defined by the plane $\pi_j$ passing through the center $O_O$ of the reference spherical surface and including the principal meridional curve MM' and the vertical crossing curve $\Sigma_i$ defined by a vertical plane ($\chi_j$) including the Y-axis.

Curves shown in FIG. 7 are obtained as follows. That is, an angle $V_z$ in the horizontal direction defined between the vertical plane ($\chi_j$) including the Y-axis and the plane (X-Y plane) including the principal meridional curve MM' is plotted every 2.8° on respective horizontal sections along seven horizontal section crossing curves ($\Phi_3$, $\Phi_2$, $\Phi_1$, $\Phi_0$, $\Phi_{-1}$, $\Phi_{-2}$, $\Phi_{-3}$) defined by seven planes ($\pi_3$, $\pi_2$, $\pi_1$, $\pi_0$, $\pi_{-1}$, $\pi_{-2}$, $\pi_{-3}$) obtained by changing an angle $V_y$ defined between the plane $\pi_j$ perpendicular to the plane (X-Y plane) passing through the center of the reference spherical surface and including the principal meridional curve MM' and the optical axis (X-axis) every 5.6°, and the values of horizontal radii of curvature at respective positions are connected with reference to the horizontal radius of curvature on the principal meridional curve MM'.

As shown in FIG. 7, in this embodiment, the horizontal sectional shape of the refracting surface in the lower portion (5.6°) of the farsight portion F defines a non-circular arc in which the horizontal radius of curvature is decreased and is then increased as it goes away from the intersection with the principal meridional curve MM'. The horizontal sectional shape of the refracting surface of the upper portion (16.8°) of the farsight portion F defines a non-circular arc in which the horizontal radius of curvature is increased and is then decreased as it goes away from the intersection with the principal meridional curve MM'. In substantially the central portion (11.2°) of the farsight portion F, the horizontal radius of curvature in the horizontal section of the refracting surface becomes almost constant, and its horizontal section shape defines almost a circular arc.

The horizontal sectional shape of the refracting surface of the intermediate portion P defines a non-circular shape. That is, in a portion near the upper portion (0°) of the intermediate portion P, the value of the horizontal radius of curvature is left unchanged from the intersection with the principal meridional curve MM' to a position at substantially ⅓ of the lens radius, and is then slightly increased as it goes away from the intersection. In the lower portion (−5.6°) of the intermediate portion, the value of the horizontal radius of curvature is considerably increased and then becomes almost constant as it goes away from the intersection with the principal meridional curve. A rate of an increase in radius of curvature is increased toward the nearsight portion N. This tendency is apparent from the comparison with the horizontal sectional shape (−11.2°) in the nearsight portion N.

The horizontal sectional shape of the refracting surface in the nearsight portion N (upper portion = 11.2°, and lower portion = −16.8°) defines a non-circular arc in which the value of the horizontal radius of curvature is considerably increased and then becomes almost constant as it goes away from the intersection with the principal meridional curve MM' in the upper portion of the nearsight portion. A position where the radius of curvature is shifted from its increasing tendency to be an almost constant value corresponds to a position at about half of W (where W is the radius of the progressive power lens). In practice, this position is preferably present within a region separated from the principal meridional curve by W/4 to 3W/4 in the horizontal direction.

As for a change in horizontal radius of curvature along the horizontal section, the following values are effective. That is, an increase in horizontal radius of curvature in side regions of the upper portion of the farsight portion F is about 7% with respect to the horizontal radius of curvature at the intersection between the horizontal section and the principal meridional curve. A decrease in radius of curvature in the lower portion of the farsight portion F is about 8% with respect to the horizontal radius of curvature at the intersection between the horizontal section and the principal meridional curve. In the lower portion of the intermediate portion P, the horizontal radius of curvature is increased and then becomes almost constant. In this case, a maximum value of the increase in the radius of curvature yields an increase in horizontal radius of curvature of about 60% with respect to that at the intersection between the horizontal section and the principal meridional curve. Upon an increase and decrease in horizontal radius of curvature in the nearsight portion N, its maximum value yields an increase in horizontal radius of curvature of about 84% with respect to that at the intersection between the horizontal section and the principal meridional curve. The maximum value of the horizontal radius of curvature in the region aside the center $O_N$ of the nearsight portion yields an increase in horizontal meridional curve of 50% to 100% with respect to that at the intersection between the horizontal section and the principal meridional curve.

Figure 8:
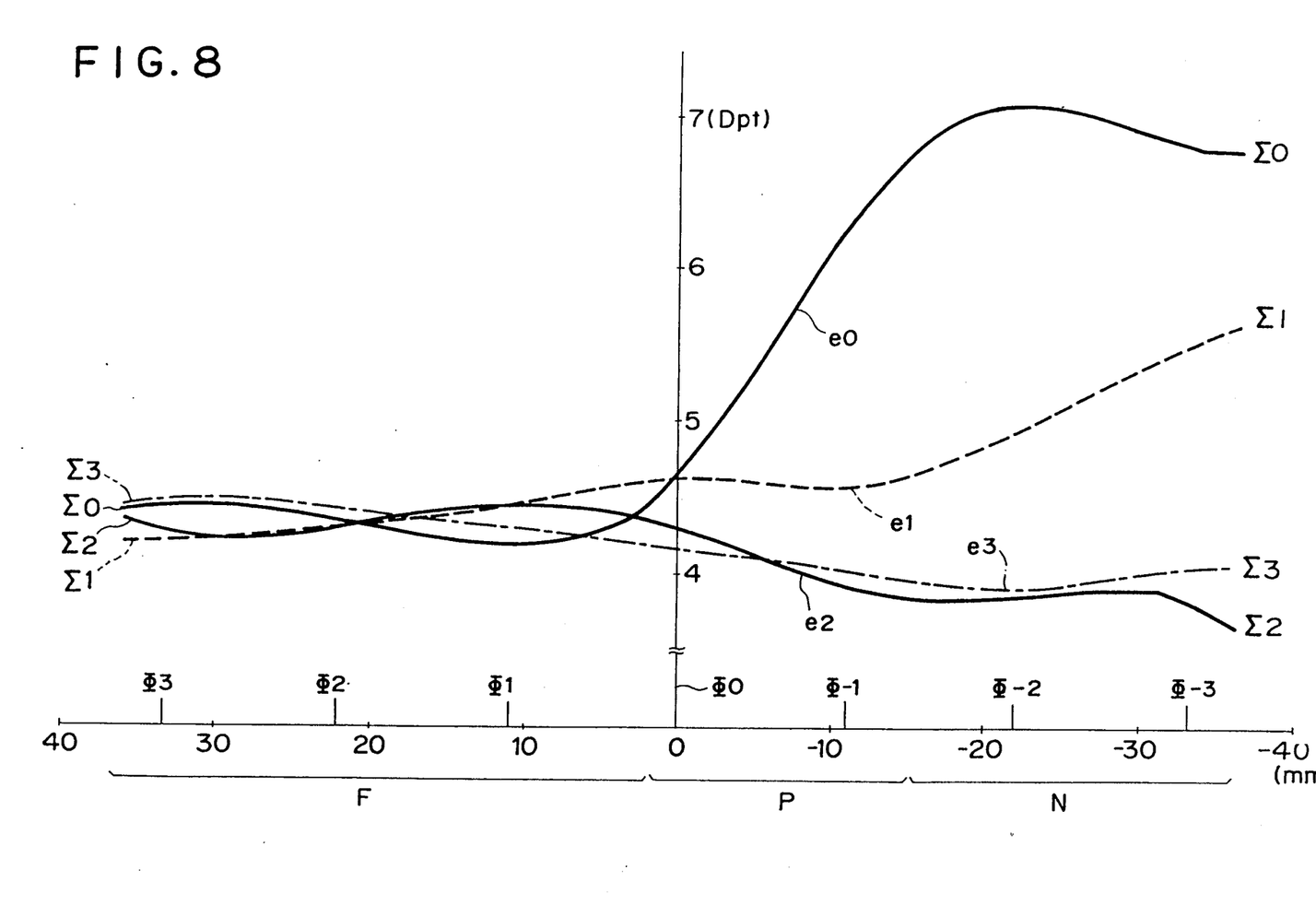
FIG. 8 is a graph showing a change, along the vertical section crossing curve, in refracting power in the horizontal direction of the progressive power lens according to the embodiment of the present invention.

FIG. 8 shows a change in horizontal refracting power corresponding to a horizontal radius of curvature along the vertical section crossing curve $\Sigma_i$. More specifically, in FIG. 8, horizontal refracting powers at respective points on the refracting surface $\sigma$ are plotted along the vertical crossing curves $\Sigma_i$ defined by the vertical plane $(\chi_j)$ including the Y-axis, and a vertical change in horizontal radius of curvature of the refracting surface $\sigma$ is illustrated. These curves are also dioptric power curves along various vertical section crossing curves. That is, the radius of curvature and the refracting power have a close relationship, and a radius of curvature $\rho$ is given by:

$$\rho = 1/R_H$$

where $R_H$ is the horizontal radius of curvature, and n is the refractive index of the lens. A horizontal refracting power $D_H$ has the following relationship:

$$D_H = (n-1)/R_H = (n-1)\rho$$

When the horizontal radius of curvature $R_H$ is expressed in units of meters, the refracting power $D_H$ is expressed in units of diopters.

$\Sigma_0$ in FIG. 8 corresponds to the principal meridional curve MM' ($V_z = 0°$), and a change in horizontal refracting power along this principal meridional curve is represented by a curve $e_0$. $\Sigma_1$, $\Sigma_2$, and $\Sigma_3$ respectively correspond to $V_z = 5.6°$, 11.2°, and 16.8°, and changes in horizontal refracting powers along the corresponding vertical section crossing curves are represented by curves $e_1$, $e_2$, and $e_3$, respectively. Assuming that $V_z = 16.8°$ almost corresponds to a maximum effective diameter as a progressive power lens, $\Sigma_1$, $\Sigma_2$ and $\Sigma_3$ respectively correspond to W/3, 2W/3, and W with respect to the radius W of the lens.

As indicated by $e_3$ in FIG. 8, in the upper portion of the farsight portion F, the refracting power at the side edge portion ($\Sigma_3$) becomes larger and the refracting powers ($e_1$, $e_2$) at the side middle portions ($\Sigma_1$, $\Sigma_2$) of the lens become smaller than the refracting power ($e_0$) on the principal meridional curve, and they are almost equal to each other in the middle portion of the farsight portion F. In the upper portion of the intermediate portion P, a refracting power at the side edge portion ($\Sigma_3$) becomes larger than the refracting power ($e_0$) as a minimum refracting power on the principal meridional curve than refracting powers ($e_1$, $e_2$) at the side middle portions ($\Sigma_1$, $\Sigma_2$) of the lens are.

In a portion between the lower portion of the intermediate portion P and the nearsight portion N, the refracting power ($e_0$) on the principal meridional curve is largest, and is increased by a predetermined dioptric power. Thereafter, the refracting power tends to be decreased in the lower portion of the nearsight portion. As for the horizontal refracting power in the side regions of the nearsight portion N, the refracting power ($e_1$) is increased and the refracting power ($e_2$) is decreased and the refracting power $e_2$ is smallest at the side middle portions ($\Sigma_1$, $\Sigma_2$) of the lens. Although the refracting power ($e_3$) of a portion ($\Sigma_3$) aside the above-mentioned portions is slightly larger than the refracting power $e_2$, they are almost equal to each other. When the effective diameter of the lens is represented by W, a horizontal surface refracting power in a region ($\Sigma_2$) separated by 2/3W or more from the principal meridional curve in the vertical direction in the middle portion of the intermediate portion N has a slight variation than a surface refracting power (4 D) at the center $O_F$ of the farsight portion, and is preferably set to fall within the range of $\pm A/2$ D when a dioptric power is represented by A (D) like in this embodiment. In this embodiment, as described above, the surface refracting power is set in a region separated by 2/3W from the principal meridional curve in the vertical direction in the middle portion of the intermediate portion N, but is effective if it is set to fall within a region separated by ½W or more.

Figure 9:
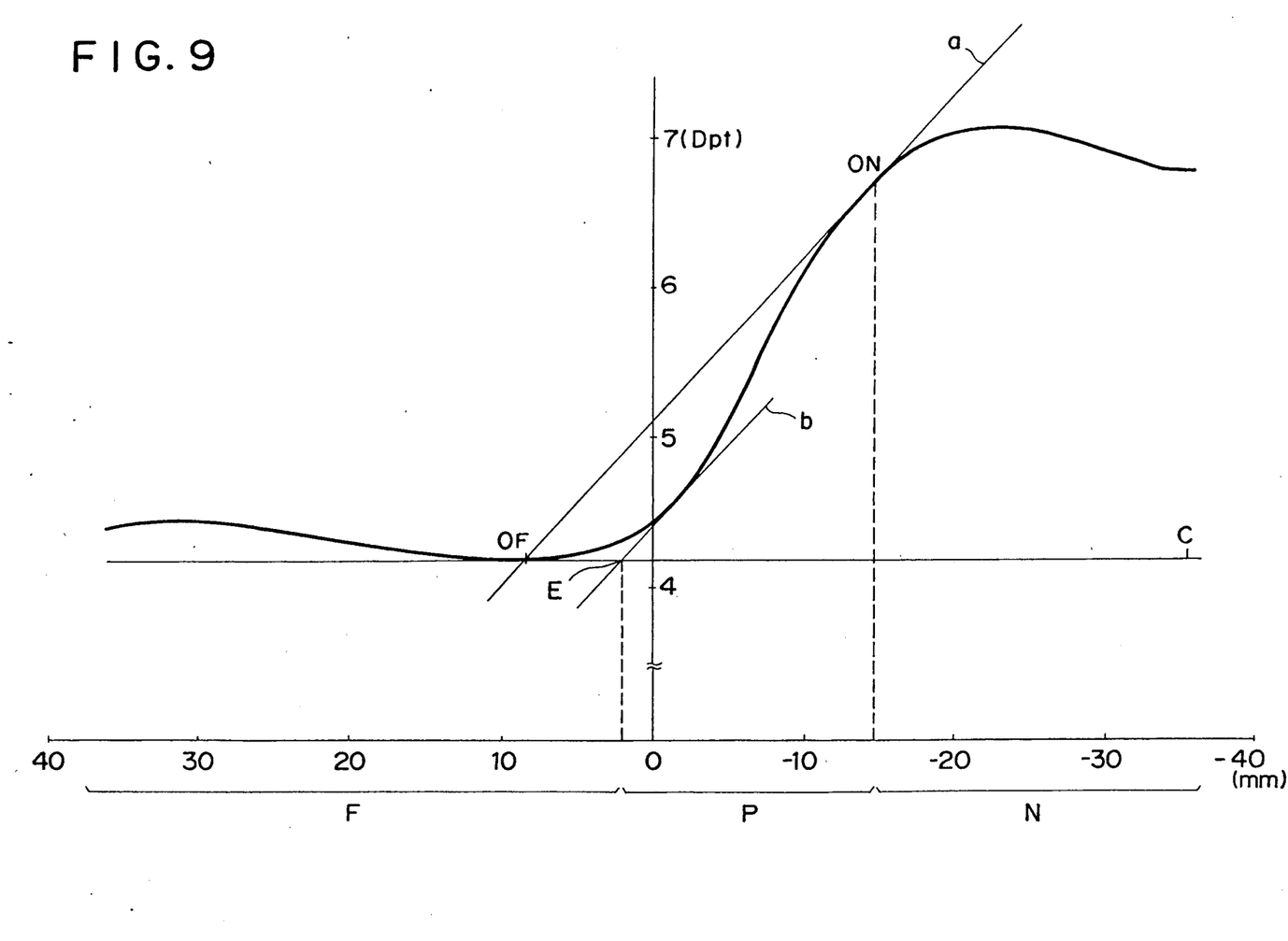
FIG. 9 is a graph showing a dioptric power curve of the progressive power lens according to the embodiment of the present invention.

In this embodiment, a distribution state of average refracting powers along the principal meridional curve is as shown in FIG. 9. The progressive power lens of this embodiment has a degree of average refraction (base curve) of 4.0 D in the farsight portion F, a dioptric power of 2.5 D, and of about 4.0 D at the center $O_F$ of the farsight portion. The base curve at the center $O_N$ of the farsight portion is about 6.5 D.

This embodiment exemplifies a case wherein the base curve is 4 D. However, even if the base curve is changed, the effectiveness of the present invention remains the same. More specifically, when the base curve is 4 D like in this embodiment, $V_z$ of the vertical section crossing curve $\Sigma_1$ is set to be 5.6°. When another base curve is employed, a ratio of the employed base curve and 4 D can be multiplied with 5.6° to obtain a value corresponding to $V_z$ of $\Sigma_1$ of the corresponding base curve. As a result, a distance between the principal meridional curve and the corresponding vertical section crossing curve on the lens surface can become almost equal to 4 D of this embodiment.

In a design of a lens surface of this embodiment of the present invention, which has such a dioptric power curve, the surface shape is designed and evaluated not only in a range of a circular shape as a lens. However, a rectangle as shown in FIG. 4 including the circular shape of the lens surface is assumed, and the surface shape is designed and evaluated within this rectangle. In this manner, a curved surface is optimized by a larger surface covering the circular shape of the lens, so that a practical lens surface can have a smooth, excellent shape.

Figure 10:
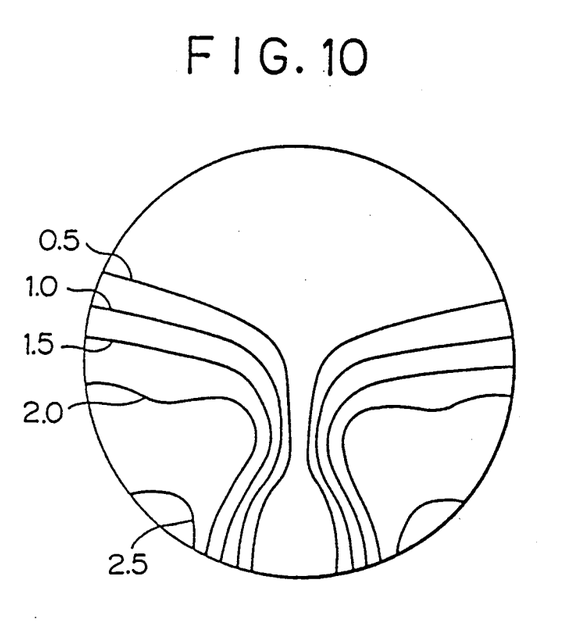
FIG. 10 is a graph showing an astigmatic difference curve of the progressive power lens according to the embodiment of the present invention.

The astigmatic difference curve graph of FIG. 10 shows performance evaluation results of a progressive power lens having a surface shape of the embodiment described above. In FIG. 10, the astigmatic difference curve is plotted every 0.5 D.

Figure 11:
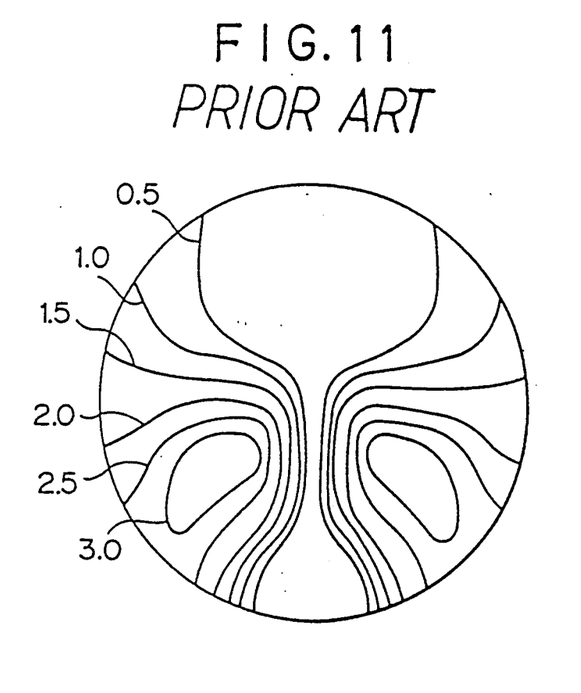
FIG. 11 is a graph showing an astigmatic difference curve of a conventional progressive power lens.

For the purpose of comparison with this embodiment, FIG. 11 schematically shows an astigmatic difference curve of a conventional progressive power lens, and a refracting power distribution curve graph on the principal meridional curve. In FIG. 11, the astigmatic difference curve is also plotted every 0.5 D.

Since the conventional progressive power lens has a different structure from that of the progressive power lens according to the present invention, as shown in FIG. 11, a density of an astigmatic difference is increased, and an astigmatic difference and an astigmatic difference gradient become steep, resulting in large distortion of an image. When a user turns his or her eyes, he or she feels uncomfortable fluctuation of an image. An aberration of an astigmatic difference from the side region of the intermediate portion influences the side region of the lower portion of the farsight portion, and when a user turns his eyes to this region, he suffers from not only blurring of an image, but also considerable distortion and fluctuation of an image.

In contrast to this, in this embodiment, as can be seen from FIG. 10, although the intermediate portion as a progressive power range is shortened, a density of an astigmatic difference of a surface refracting power is decreased, and an astigmatic difference gradient is reduced, thus eliminating distortion and fluctuation of an image.

An important point of the progressive power lens of the present invention will be described below with reference to FIG. 9 showing the dioptric power curve of this embodiment.

The center $O_F$ of the farsight portion is located on the principal meridional curve having a predetermined base curve of the farsight portion F, and serves as a measurement reference point of the farsight portion F in practice. The center $O_N$ of the nearsight portion is located on the principal meridional curve having a predetermined base curve of the nearsight portion N, and serves as a measurement reference point of the nearsight portion N in practice.

The farsight eye point E serves as a reference position used when a lens is fitted in a frame of spectacles, and corresponds to a farsight reference point coinciding with a farsight eye line passing position when the frame of spectacles is worn. The position of the farsight eye point E is determined independently of the geometric center of the lens, as indicated by the average refracting power distribution curve on the principal meridional curve shown in FIG. 9, and is defined as follows in the present invention. More specifically, in the dioptric power curve shown in FIG. 9, in which average degrees of surface refracting power on the principal meridional curve are plotted at respective positions on the principal meridional curve an intersection E where a straight line b which is parallel to a straight line a connecting the center $O_F$ of the farsight portion F and the center $O_N$ of the nearsight portion N and contacts the dioptric power curve on the intermediate portion P side intersects a straight line c representing an average refracting power at the center $O_F$ of the farsight portion is determined as a farsight eye point.

In some progressive power lenses, the entire principal meridional curve is defined as continuous microscopic spherical surfaces, i.e., a so-called umbilical point curve. Meanwhile, in some other progressive power lenses, a certain region on the principal meridional curve has a surface shape having different radii of curvature in orthogonal directions. The normal progressive power lenses can be roughly classified into two types in terms of the surface shape on the principal meridional curve, i.e., one in which the entire principal meridional curve is defined as umbilical points, and one in which a radius of curvature in a direction parallel to the principal meridional curve is different from that in a direction perpendicular thereto in a certain region on the principal meridional curve without employing an umbilical point curve. The present invention is effective for both the types.

Since a progressive power lens is worked in correspondence with a frame of spectacles, the farsight portion F, the intermediate portion P, and the nearsight portion N, especially, the farsight portion F and the nearsight portion N including their peripheral portions vary depending on the shapes of frames. However, a progressive power lens before work is a circular lens having a diameter of about 60 mm or more, and is delivered to spectacles shops in this state. Then, the lens is worked in correspondence with a desired frame shape. Therefore, the surface shape of the progressive power lens of the present invention is defined with reference to a shape before work. In a design of an optimal surface shape of a progressive power lens, it is important to determine an aberration balance in consideration of not only a central region which is frequently used but also a surface shape in a wider region including effective regions to be used.

What is claimed is:

1. A progressive power lens comprising, along a principal meridional curve, a farsight portion having a refracting power corresponding to a distant view, a nearsight portion having a refracting power corresponding to a near view, and an intermediate portion, located between said farsight and nearsight portions, for continuously and smoothly connecting the refracting powers of said farsight and nearsight portions, and wherein a vertical sectional shape of a refracting surface of said farsight portion is formed so that a value of a vertical radius of curvature is increased as it goes away from an intersection with said principal meridional curve along a horizontal section curve in an upper portion of said farsight portion, the value of the vertical radius of curvature is decreased as it goes away from an intersection with said principal meridional curve along a horizontal section curve in a lower portion of said farsight portion, and the value of the vertical radius of curvature is kept substantially constant along a horizontal section curve near a central portion of said farsight portion, a vertical sectional shape of the refracting surface in an upper region of said intermediate portion is formed so that the value of the vertical radius of curvature is decreased as it goes away from an intersection with said principal meridional curve along a horizontal section curve, and a vertical sectional shape of the refracting surface in a lower region of said intermediate portion is formed so that the value of the vertical radius of curvature is increased and then decreased as it goes away from an intersection with said principal meridional curve along a horizontal section curve.

2. A lens according to claim 1, wherein a position where the value of the vertical radius of curvature in the lower region of said intermediate portion is shifted from an increasing tendency to a decreasing tendency as it goes away from an intersection with said principal meridional curve along a horizontal section curve is separated by at least 15 mm in a direction perpendicular to said principal meridional curve, and is gradually spaced apart from said principal meridional curve toward said nearsight portion.

3. A lens according to claim 1, wherein near a center of an upper region of said nearsight portion, the vertical radius of curvature is increased and then becomes substantially constant as it goes away from an intersection with said principal meridional curve along a horizontal section curve.

4. A lens according to claim 3, wherein near the center of said nearsight portion, a position where the vertical radius of curvature is shifted from an increasing tendency to be a substantially constant value as it goes away from an intersection with said principal meridional curve along a horizontal section curve is present within a region separated by W/4 to 3W/4 in a direction perpendicular to said principal meridional curve (where W is a radius of said progressive power lens).

5. A progressive power lens comprising, along a principal meridional curve, a farsight portion having a refracting power corresponding to a distant view, a nearsight portion having a refracting power corresponding to a near view, and an intermediate portion, located between said farsight and nearsight portions, for continuously and smoothly connecting the refracting powers of said farsight and nearsight portions, and wherein a horizontal sectional shape of a refracting surface of an upper portion of said farsight portion defines a non-circular arc in which a value of a horizontal radius of curvature is increased as it goes away from an intersection with said principal meridional curve along a horizontal section curve, a horizontal sectional shape of the refracting surface of a lower portion of said farsight portion defines a non-circular arc in which the value of the horizontal radius of curvature is decreased and then increased as it goes away from an intersection with said principal meridional curve along a horizontal section curve, and a horizontal sectional shape of the refracting surface of a substantially central portion of said farsight portion defines a circular arc in which the vertical radius of curvature is substantially constant along a horizontal section curve, and a horizontal sectional shape of the refracting surface between a central region of said intermediate portion and an upper portion of said nearsight portion is formed so that the value of the horizontal radius of curvature is increased and then becomes substantially constant as it goes away from an intersection with said principal meridional curve along a horizontal section curve.

6. A lens according to claim 5, wherein in the portion between the central region of said intermediate portion and the upper portion of said nearsight portion, a position where the value of the horizontal radius of curvature of the refracting surface is shifted from an increasing tendency to be a substantially constant value as it goes away from an intersection with said principal meridional curve along a horizontal section curve is present within a region separated by W/4 to 3W/4 in a direction perpendicular to said principal meridional curve (where W is a radius of said progressive power lens).

7. A lens according to claim 5, wherein in at least a middle portion of said nearsight portion of the refracting surface between said intermediate portion and said nearsight portion, a surface refracting power in a direction parallel to a horizontal section of the refracting surface in a region separated by at least W/2 in a direction perpendicular to said principal meridional curve falls within a range of $\pm A/2$ diopter (where W is a radius of said progressive power lens and A (diopter) is a dioptric power with respect to a surface refracting power at a center of said farsight portion).

8. A progressive power lens comprising, along a principal meridional curve, a farsight portion having a refracting power corresponding to a distant view, a nearsight portion having a refracting power corresponding to a near view, and an intermediate portion, located between said farsight and nearsight portions, for continuously and smoothly connecting the refracting powers of said farsight and nearsight portions, and wherein a shape of a refracting surface of said farsight portion is formed such that values of vertical and horizontal radii of curvature are increased as they go away from an intersection with said principal meridional curve along a horizontal sectional curve in an upper portion of said farsight portion, that the value of the vertical radius of curvature is decreased as it goes away from an intersection with said principal meridional curve along a horizontal section curve and the value of the horizontal radius of curvature is decreased and then increased as it goes away from an intersection with said principal meridional curve along a horizontal section curve in a lower portion of said farsight portion, and that the vertical and horizontal radii of curvature are substantially constant along a horizontal section curve near a central portion of said farsight portion, a shape of the refracting surface of said intermediate portion is formed such that the value of the vertical radius of curvature is decreased as it goes away from an intersection with said principal meridional curve along a horizontal section curve and the value of the horizontal radius of curvature is substantially constant and then is slightly increased as it goes away from an intersection with said principal meridional curve in an upper portion of said intermediate portion, and that the value of the vertical radius of curvature is increased and then decreased as it goes away from an intersection with said principal meridional curve along a horizontal section curve and the value of the horizontal radius of curvature is considerably increased and then becomes substantially constant as it goes away from an intersection with said principal meridional curve in a lower portion of said intermediate portion, and a shape of the refracting surface of said nearsight portion is formed such that the value of the vertical radius of curvature is increased and then becomes substantially constant as it goes away from an intersection with said principal meridional curve along a horizontal section curve and the value of the horizontal radius of curvature is considerably increased and then becomes substantially constant to be continuous with the lower portion of said intermediate portion as it goes away from an intersection with said principal meridional curve along a horizontal section curve in an upper portion of said nearsight portion, and that the vertical radius of curvature becomes substantially constant along a horizontal section curve and the value of the horizontal radius of curvature is considerably increased and then decreased as it goes away from an intersection with said principal meridional curve in a lower portion of said nearsight portion.

9. A lens according to claim 8, wherein a position in a portion between a central region of said intermediate portion and the upper portion of said nearsight portion where the value of the horizontal radius of curvature of the refracting surface is shifted from an increasing tendency to be a substantially constant value as it goes away from the intersection with said principal meridional curve along a horizontal section curve, and a position near a center of said nearsight portion in the upper portion of said nearsight portion where the vertical radius of curvature is shifted from an increasing tendency to be a substantially constant value as it goes away from the intersection with said principal meridional curve along a horizontal section curve are present within regions respectively separated by W/4 to 3W/4 in a direction perpendicular to said principal meridional curve (where W is a radius of said progressive power lens).

10. A lens according to claim 8, wherein in at least a middle portion of said nearsight portion of the refracting surface between said intermediate portion and said nearsight portion, a surface refracting power in a direction parallel to a horizontal section of the refracting surface in a region separated by at least W/2 in a direction perpendicular to said principal L meridional curve falls within a range of $\pm A/2$ diopter (where W is a radius of said progressive power lens and A (diopter) is a dioptric power with respect to a surface refracting power at a center of said farsight portion).

11. A lens according to claim 8, wherein a position where the value of the vertical radius of curvature in the lower region of said intermediate portion is shifted from an increasing tendency to a decreasing tendency as it goes away from an intersection with said principal meridional curve along a horizontal section curve is separated by at least 15 mm in a direction perpendicular to said principal meridional curve, and is gradually spaced apart from said principal meridional curve toward said nearsight portion.

* * * * *